United States Patent
Surek

(10) Patent No.: US 7,830,909 B2
(45) Date of Patent: Nov. 9, 2010

(54) TRANSPARENT SUB-WAVELENGTH NETWORK

(75) Inventor: Steven A. Surek, Leonardo, NJ (US)

(73) Assignee: Ciena Corporation, Linthicum, MD (US)

( * ) Notice: Subject to any disclaimer, the term of this patent is extended or adjusted under 35 U.S.C. 154(b) by 50 days.

(21) Appl. No.: 12/212,018

(22) Filed: Sep. 17, 2008

(65) Prior Publication Data

US 2009/0010280 A1 Jan. 8, 2009

Related U.S. Application Data

(62) Division of application No. 10/895,007, filed on Jul. 20, 2004, now Pat. No. 7,443,888.

(60) Provisional application No. 60/508,000, filed on Oct. 2, 2003.

(51) Int. Cl.
*H04J 3/24* (2006.01)

(52) U.S. Cl. .................. 370/465; 370/474; 370/476; 370/516

(58) Field of Classification Search .................. None
See application file for complete search history.

(56) References Cited

U.S. PATENT DOCUMENTS

| | | | | |
|---|---|---|---|---|
| 4,961,188 A | 10/1990 | Lau | | 370/517 |
| 5,168,494 A | 12/1992 | Mueller | | 370/535 |
| 5,185,736 A | 2/1993 | Tyrrell et al. | | 370/358 |
| 5,260,978 A | 11/1993 | Fleischer et al. | | 375/354 |
| 5,457,717 A * | 10/1995 | Bellamy | | 375/372 |
| 5,604,773 A | 2/1997 | Urala | | 375/372 |
| 6,396,852 B1 | 5/2002 | Simmons | | 370/535 |
| 6,463,477 B1 | 10/2002 | Fontenot | | 709/236 |
| 6,904,110 B2 * | 6/2005 | Trans et al. | | 375/350 |
| 7,054,538 B2 | 5/2006 | Mahgerefteh et al. | | 385/147 |
| 2002/0034271 A1 * | 3/2002 | Heller et al. | | 375/350 |
| 2003/0043434 A1 | 3/2003 | Brachmann et al. | | 359/158 |
| 2005/0002403 A1 * | 1/2005 | Roberts et al. | | 370/395.51 |

OTHER PUBLICATIONS

Steven, "TCP/IP Illustrated, vol. 1, The Protocols", ISBN 020163349, Copyright 1994 by Addison Wesley, p. xv, p. 10, figure 1.7.

* cited by examiner

*Primary Examiner*—Chi H. Pham
*Assistant Examiner*—Shick Hom
(74) *Attorney, Agent, or Firm*—Clements Bernard PLLC; Christopher L. Bernard; Tyler S. Brown

(57) ABSTRACT

An arrangement that allows transmission of client signals with higher clock fidelity is achieved by developing a phase offset measure at an ingress node, communicating it to the egress node, and recovering the client's clock from the received data and from the received phase-offset information. The ability to recover the client's clock with high fidelity is enhanced by adaptive pointer processing in intermediate nodes and the egress node of the network that the client's signal traverses. The adaptive pointer processing filters incoming pointers from upstream nodes and injects new positive and negative pointer justifications in excess of what is minimally necessary to allow them to be filtered by successive nodes and insure proper transmission over a network that employs a protocol involving framing layer frames embedded in communication layer frames. Illustratively, the network protocol is an extended ITU Recommendation G.709 Digital Wrapper protocol, arranged to employ frames of 15240 columns by four rows.

11 Claims, 4 Drawing Sheets

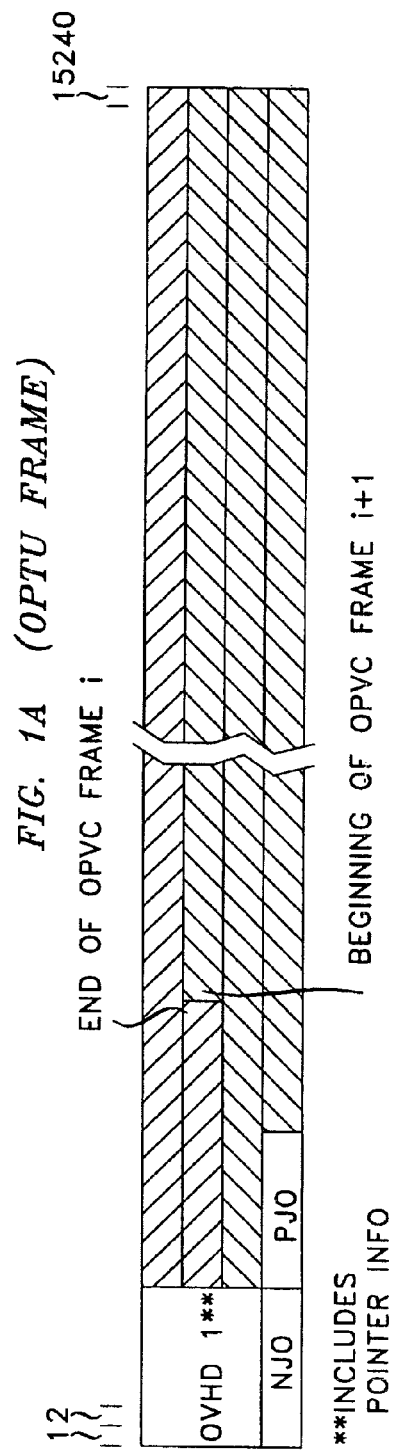
FIG. 1A (OPTU FRAME)
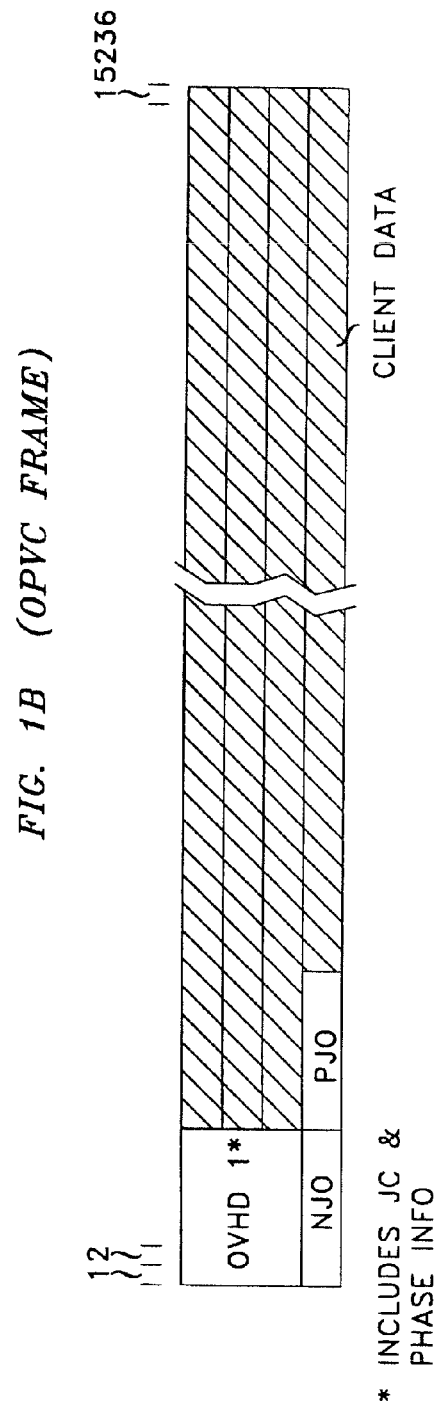
FIG. 1B (OPVC FRAME)

TRANSPARENT SUB-WAVELENGTH NETWORK

CROSS-REFERENCE TO RELATED APPLICATION(S)

The present application is a divisional of U.S. patent application Ser. No. 10/895,007 filed Jul. 20, 2004 now U.S. Pat. No. 7,443,888, and U.S. patent application Ser. No. 10/895,007 is related to, and claims the benefit of U.S. Provisional Application No. 60/508,000, filed on Oct. 2, 2003, the contents of each are herein incorporated by reference.

FIELD OF THE INVENTION

This application relates to data transport arrangements that allow a provider to support any client data protocol, as well as provide quality of service monitoring that is ascertainable without delving into the client's signal. More particularly, this application relates to an arrangement that, for example, allows a subwavelength SONET client signal to be transported transparently and with sufficiently high fidelity so that inherent timing information of the signal is maintained.

BACKGROUND OF THE INVENTION

A transport provider that wishes to offer high capacity facilities to customers can implement the offer by simply providing so-called "dark fiber," allowing the customers to place whatever signals they wish on the fiber.

One value proposition is for the provider to offer a fiber and a "service," whereby a channel is provided for transmission of information, with a guarantee that the transmitted information will arrive at its destination with an agreed-to quality of service. To provide the agreed-to quality of service, the provider sends the information over the fiber in a particular protocol that is chosen by the provider, monitors the quality of the service, and performs appropriate maintenance activities, as needed. That means that the provider carries on the fiber various signals that do not belong to the customer for the purpose of monitoring the quality of service. Dark fiber clearly cannot meet this value proposition.

An advanced value proposition is for the provider to offer a fiber, and to also offer a plurality of channels, concurrently, using a particular protocol, with the channels adapted to carry client signals. SONET is an example of such a value proposition. SONET encapsulates a client-provided signal into successive Synchronous Payload Envelope (SPE) blocks of data, injects these blocks into successive SONET frames, modulates numerous SONET frames onto different wavelengths, and places them onto a fiber. The reverse process takes place when data needs to be extracted.

One aspect of SONET is that it offers clients a variety of bandwidths. The lowest SONET bandwidth (OC-1) is capable of carrying a DS3 signal, having a 44,736 Mb/s rate, and the SONET standard contemplates higher bandwidths in multiples of OC-1. However, commercial equipment that carries SONET signals over fiber handles only OC-3, OC-12, OC-48, and OC-192 signals. Intermediate rates are generally multiplexed into one of these four signal rates.

Another aspect of SONET is that it can be add/drop multiplexed, meaning that a given channel can be extracted from, or added to, the information signal that is contained in a given wavelength without having to extract all of the other channels that are contained in the information signal, or to reconstitute the information signal.

Still another aspect of SONET is that it carries it's own maintenance information, permitting the provider to offer a guaranteed level of service quality without having to delve into the client's signal per se.

What would be desirable that SONET cannot provide is the ability to transmit client signals that themselves are SONET frames, transparently, and in a bandwidth efficient manner while maintaining the timing integrity of the client SONET signals themselves. By "transparently" what is meant is that the offered client's signal (e.g., an OC-3 SONET signal) can be communicated through the network, from an ingress node to an egress node, in a manner that allows the client's signal to be multiplexed onto a fiber with one or more other signals, where the other signals possibly have different bandwidths, or different protocols, and where the other signals may be time-division-multiplexed onto the same wavelength, or onto different wavelengths, the clients signal can have any desired protocol (i.e., including SONET), the client's signal can be add/drop multiplexed at any point in the network without requiring add/drop operations on other signals and, correspondingly, add/drop operations need not be undertaken relative to the client's signals when add/drop multiplexing is performed on some other signal on the fiber, and the provider is able to ascertain quality of service provided to the client without having to look into the client's signal per se.

As indicated above, SONET fulfills the above transparency requirements, except that it does not allow the client to send a signal that itself follows the SONET protocol while maintaining the timing integrity of the SONET client signal. Clearly, for example, one cannot send an OC-3 SONET client data frame as a unit over an OC-3 SONET frame, because the payload bandwidth of the provider's OC-3 frames is simply not large enough to carry both the payload and the overhead of the client's signal. One possibility that has been studied by Lucent Technologies is to stuff an OC-3 frame into an OC-4 signal. After extensive efforts it was concluded that this proposal was not able to meet the SONET timing standards for the client SONET signal. This is clearly evident in FIG. 5-18($a$) of T1X1.3/2002-036 contribution to the T1 Standard Project-T1X1.3. This contribution, titled "Jitter and Wander Accumulation for SONET/SDH over SONET/SDJ (SoS) Transport" by Geoffrey Garner, dated Sep. 30, 2002, which is hereby incorporated by reference. Note that all simulation depicted in the aforementioned FIG. 5-18($a$) are above the OCN Reference Mask; where the need is to be below this mask.

Separately, the Digital Wrapper standard exists (G.709) that contemplates signals flowing in frames having one of three line rates. The lowest rate (OTU1) carries 20,420 frames/s, and each frame consists of 16,320 bytes that structurally can be viewed as 4 rows and 4080 columns. Sixteen columns are devoted to overhead, 3808 columns are devoted to client payload, and 256 columns are devoted to forward error correction, which results in a payload rate of approximately 2.666 Gb/s. The OTU1 rate can be used to communicate a 2.48832 Gb/s OC-48 SONET signal, as the payload area was sized for that capacity. Equipment exists to terminate a number of SONET signals and, after removing their payload information (SPE), multiplex the individual payloads to form an OC-48 signal, to encapsulate it in an OTU1 digital wrapper, and to modulate the resulting signal onto a chosen wavelength. To date, however, no design exists for channelizing the Digital Wrapper for the many lower rate data services that a telecommunications carrier is called upon to transport, such as the above-mentioned OC-3 signal, i.e., a design that allows one to carry sub-multiples of the OTU1 signal (also termed sub-wavelength channels) using the Digital Wrapper standard.

BRIEF SUMMARY OF THE INVENTION

An advance in the art is realized by extending the Digital Wrapper standard G.709 to create a tributary group from OTU1 16 frames forming a tributary group. This group this group is mapped onto a grouping of 64 OTN tributary frames that are di-byte interleaved. Each tributary frame thus can be viewed as a block of 15240 columns and 4 rows, where the first 4-column section is devoted to overhead. The remaining columns are devoted to payload data, with the fourth row of the overhead section assigned to negative pointer justification opportunities, and the following four bytes (in columns 5th through 8th) are assigned to positive pointer justification opportunities. The payload data section is able to hold OPVC1 frames, each of which has an overhead section, and preassigned negative and positive justification byte positions.

With the extended Digital Wrapper protocol, which seamlessly dovetails with the G.709 standard, data that entered an ingress node is synchronized to the local clock and a phase offset measure is developed and included in the transmitted signal. This measure is evaluated repeatedly, for example, every OPVC1 frame. At an egress node, the phase-offset measure that is received with the signal is employed to derive a more accurate client signal clock, and this enables the network to support client signals that need to be communicated with high clock fidelity, such as SONET signals.

Additionally, in order to minimize jitter and wander, pointer processing that is performed in each intermediary node through which a signal travels between the ingress and egress nodes is modified to introduce positive and negative justification bytes in excess of what is minimally necessary so as to shift energy into higher frequencies that can be filtered out by the phase lock loop at the egress node.

BRIEF DESCRIPTION OF THE DRAWINGS

The present invention is illustrated and described herein with reference to the various drawings, in which like reference numbers denote like method steps and/or system components, respectively, and in which:

FIGS. 1A and 1B depict a tributary frame in accord with the principles disclosed, and an OPVC1 frame that is injected payload of the tributary frame;

DETAILED DESCRIPTION OF THE INVENTION

Figure 2:
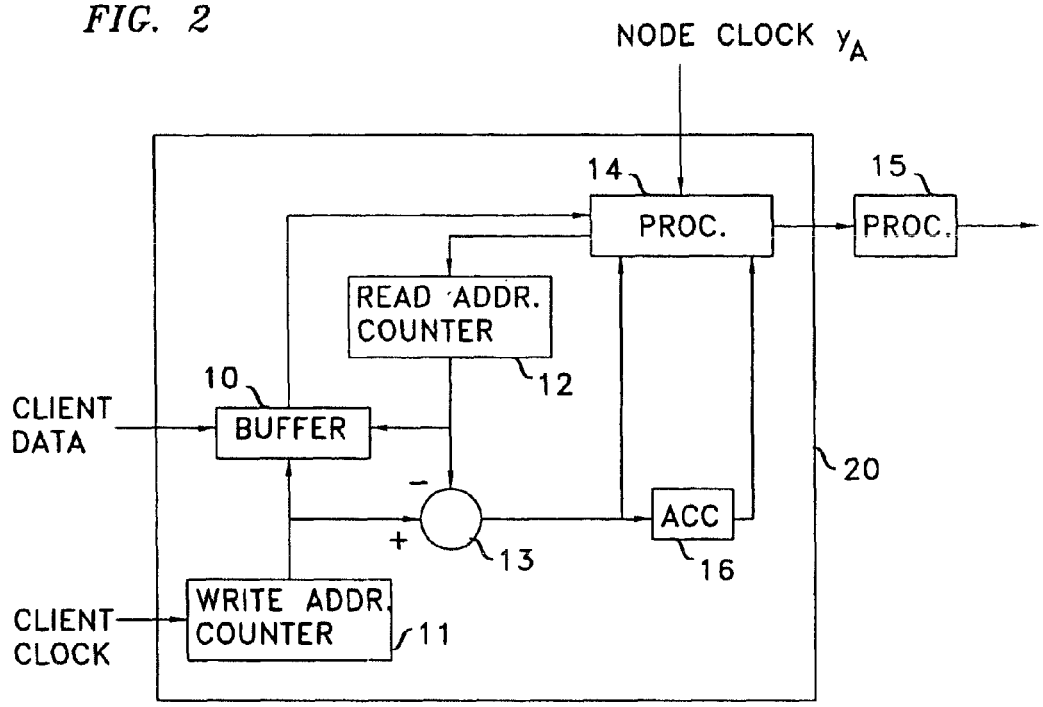
FIG. 2 is a block diagram showing selected aspects of an ingress node in accordance with the principles disclosed herein.

To gain an appreciation for the disclosed advance, it is beneficial to review the timing problems that arise in the SONET network in spite of the fact that all nodes in a SONET network nominally operate off a common clock. There are two specific timing problems of interest: timing impairments as a result of mapping the client signal into the SONET frame, and timing impairments resulting from SONET pointer processing. Each of these will be discussed separately.

SONET employs a layered structure, with one layer concerning itself with framing, and another with the payload being carried. As for the framing layer, a SONET STS-1 signal consists of a sequence of frames each containing 810 bytes that can be viewed as a 90 column by a 9 row arrangement, where the first three columns contain transport overhead bytes. Of the 27 available header bytes, 9 bytes (the three transport overhead bytes of the first three rows) are devoted for Section Overhead, and 18 bytes are devoted for Line Overhead. The remaining 87 columns make up the STS-1 envelope capacity, which contains the synchronous payload envelope (SPE). The first column of the SPE is devoted to Path Overhead, and two columns (columns 30 and 59) are devoted to "fixed stuff". This leaves 756 bytes in the SPE for client data, which is sufficient for mapping a DS3 client data signal.

The SPE can be placed into the STS-1 envelope capacity beginning at any byte position within the STS-1 envelope capacity. The location of the first byte of the SPE (which is called the J1 byte) is identified by a pointer that is contained in the first two bytes of the Line Overhead (H1 and H2 bytes) of the STS-1 frame.

A SONET client's input data that enters a SONET ingress node (e.g., node A) is mapped into the SPE using conventional buffering techniques. That is, client's data is written into a buffer memory at the client's clock frequency, and is outputted from the buffer memory at the ingress node's clock frequency. The read-out clock frequency, on the average, ought to be the same as the write-in clock, so as not to cause an overflow or underflow. In order to prevent a possible underflow of the buffer when the read-in clock is consistently slower, the read-out operation is stalled (no data is read) at prespecified points of the SPE, as necessary. In order to prevent overflow when the clock situation is reversed, data is read out at times within the SPE that normally are not used for reading out data. A SONET frame is then created (having a fixed number of data bytes) by inserting the SPEs into the SONET frames as indicated above, using the pointer to identify where the SPE begins, and once the SONET frame is created, it can be sent out, for example, to node B.

It is important to note that these operations (stalling the reading out process and/or reading out extra data) introduce phase jumps in the mapped data stream, which cause timing impairments in a recovered client signal. We refer to this as mapping impairments.

Considering what happens at node B, it is possible that the frequency of the node B clock might be slightly different from that of the node A clock even though the intent of the SONET network is for all nodes to operate off a common clock (this can occur during timing reference failures or due to the introduction of noise into the timing signals). Because of this possibility and because of normal propagation delays in the signal flows throughout the network, node B must perform at least the following steps:

1. derive an approximation of the node A clock, $\bar{y}_A$, from the incoming signal, 2. using clock $\bar{y}_A$, extract the header information that is within the incoming frame, 3. using clock $\bar{y}_A$, extract the payload information that is within the incoming frame, 4. process the extracted header information and react to it, 5. using clock $y_B$, create new header information for an outgoing frame, 6. using clock $y_B$, inject the extracted payload, into the outgoing frame, and 7. send out the newly created frame (at clock rate $y_B$).

Of the above steps, step 6 is the most challenging, because of the asynchrony between the clocks, $\bar{y}_A$, and $y_B$. The task is to create an SPE that is to be inserted into a node B SONET frame, which operates at rate $y_B$, and to do so from data that is received from node A at frequency $\bar{y}_A$. If $y_B > \bar{y}_A$ (even a little) the data arrives more slowly than it leaves, and a consequence of this is that every so often the outputting of actual data must be arrested because there is no data to output. Since the node's output is at a constant clock rate ($y_B$), during a clock period when there is no data, the system must simply wait and, effectively output a dummy data byte. In order to avoid having to output dummy bytes whenever a no-data condition exists, a buffer is included that, though it introduces delay, affords the flexibility to place dummy bytes in pre-specified overhead positions (the byte position immediately following lie H3 byte of the Line Overhead). Since the SONET frames that are created by node B are outputted at a fixed rate, the insertion of a dummy byte in an SPE shifts the positioning of the following SPE forward within each SONET frame. To remain aware of the positioning of the SPE starting point, the pointer in the SONET frame's overhead is adjusted (incremented) to specify where the starting point of the SPE is.

Correspondingly, if $y_B < \bar{y}_A$, the data arrives more quickly than it leaves, and a consequence of this is that, though the arriving data can be buffered, eventually all of it must be placed within an outgoing SPE, in some otherwise unused byte position, or else an overflow condition would occur. That means that an SPE, or at least the SONET frame, must have such an unused byte position. Indeed, the SONET design includes a byte in the header (the H3 byte) that can be so used. Thus, when $y_B < \bar{y}_A$, every so often (depending on the size of the difference between $y_B$ and $\bar{y}_A$) a data byte must be stuffed into the available byte position that does not normally carry client data (H3 byte). Consequently, the SPE ends at one position sooner than it would otherwise, and the next SPE's J1 byte is stored one position sooner as well. Correspondingly, the pointer is decremented to correctly specify the SPE's starting point.

All of this shifting of SPE's, inserting dummy bytes, and/or inserting extra data bytes is carried out with what is typically referred to as "pointer processing." A side effect of the pointer processing, or more specifically of the addition of dummy bytes or extra data bytes, that results from the asynchrony between clock $\bar{y}_A$ and $y_B$ is that the number of actual client bytes in an SPE differs from frame to frame creating phase jumps, and client signal tiring impairments are thus introduced. In addition, as each node performs its own pointer processing functions, asynchronously of all other nodes, pointer adjustment decisions may be made at the same time in successive nodes, causing an accumulation of error.

If the clients data were to be extracted at node B, i.e., if node B were the egress node, it would be quite simple to extract the SPEs based on knowledge of their starting points (provided by the pointer), extract the overhead bytes of the SPEs, identify the dummy bytes and stuffed bytes from apriori information about the nature of the input signal (i.e., number and location of the "fixed stuff" columns) and from the pointer, and output the extracted client data as it is unmapped from the SPE. This unmapping yields the client's signals, but at an irregular rate. There is a hiatus during the 27 transport overhead bytes (that, on occasion, may include a data bye in H3), a hiatus during the 9 path overhead bytes, a hiatus during (at least some of) the 18 fixed stuff bytes (from columns 30 and 59), and a hiatus during the inserted dummy bytes. The client, however, desires its data to be provided by the egress node at a constant rate, and desirably, at the rate at which the data was offered to the ingress node. In addition, the client signal could conceivably traverse multiple SONET networks (due, for example, to the fact that a service may need to be carried via multiple service providers in order to be transmitted end-to-end, i.e., from a local exchange carrier (LEC) to an inter-exchange carrier (IXC) to another LEC). Thus, multiple segments that each have pointer processing, and possibly mapping and unmapping, may be cascaded and the timing impairments introduced by each segment would accumulate, giving rise to a client signal whose clock is impaired. The timing impairments produced by these operations make it impossible to use a received client signal (i.e., that signal derived from the SPE) that is a SONET signal which is used as a source of timing for another SONET network.

Refocusing on the objective of offering a facility to transport client data of any protocol transparently, including SONET, in order to compensate for the above effects in the SONET network, in accord with the principles disclosed herein a different transport protocol is used, to wit, the Digital Wrapper standard G.709, which happens to be very similar to SONET, but is flexible enough to permit including a number of unique and novel features in the network's nodes that are not defined for current or next generation SONET equipment. These functions, which do not exist in current generation equipment, and are not defined for next generation Digital Wrapper or SONET equipment, are compensation for the timing impairments introduced end-to-end by the client signal mapping and unmapping process, and node-to-node compensation for the timing impairments introduced by the pointer adjustments received from the previous node.

The compensation for end-to-end timing impairments introduced due to client signal mapping and unmapping functions is addressed through the use of phase-offset information that is derived from the phase difference between the ingress client clock and the ingress node system clock. The phase-offset information is transported end-to-end with the data signal and is used to compensate the egress client clock derived from the outgoing client data stream. This eliminates most of the client egress clock timing error due to mapping unmapping functions.

The compensation for node-to-node timing impairments introduced due to pointer processing is addressed through the use of a pointer filter in conjunction with an adaptive pointer generator that filters upstream pointers generated by previous nodes and adaptively generates its own pointers in a manner that allows downstream filters to remove their effects in succeeding nodes. This advanced pointer processor is described in more detail later.

In accord with an embodiment disclosed herein, the low rate of the Digital Wrapper standard G.709, i.e., OTU1, is used as the underlying network transport mechanism, which carries data in frames running at the rate of approximately 20,420 frames/sec. To provide for the sub-wavelength channels, i.e., for the transporting of signals lower than the SONET OC-48 signals, in accord with the principles disclosed herein an extension to the G.709 Digital Wrapper standard is provided. The extension takes 64 consecutive OTU1 frames, where each frame having 14 columns of overhead at the beginning of each frame, and combines the payload (3808 columns) and payload overhead (2 columns) areas into a very large frame (243,840 columns). Within that very large frame the columns are divided to create 16 frames (also referred to herein as OPTU1 frames, or communication layer frames), that are time division multiplexed and di-byte interleaved timeslots, by assigning the first two columns of the large frame assigned to timeslot #1, the second two columns to timeslot #2, etc. through to the 16.sup.th timeslot, and then repeating the assignments until all columns of the large frame are assigned, thereby attaining effectively communication layer frames having 15,240 columns each. This frame is illustrated in FIG. 1A. Each OPTU1 frame has four columns of overhead and 15,236 columns of timeslot envelope capacity (similar to STS-1 envelope capacity). The four columns of overhead (OVHD) contain pointer information (which controls the operation of an advanced pointer processor to be described later) in the first three rows of the frame and 4 stuff byte positions (negative justification opportunity bytes NJO)) in the fourth row of the frame. The remaining 15,236 columns constitute the envelope capacity, which includes 4 potential dummy byte positions (positive justification opportunity bytes (PJO)) next to the 4 stuff byte positions in the fourth row of the frame. In such an arrangement, the payload envelope is a frame (herein referred to as an OPVC1 frame, or framing layer frame) that is not unlike the SONET's SPE, which frame contains four columns of timeslot path overhead and 15,232 columns of payload data (into which the client signal is mapped). This is illustrated in FIG. 1B. The overhead bytes of the fourth row are reserved for negative justification bytes, and the four bytes in the fourth row that follow the negative justification bytes are reserved for positive justification bytes. The path overhead includes 10 bits reserved for phase-offset information, and two mapping justification bits (JC). A JC value of 00 means that no dummy bytes were inserted and no extra bytes were stuffed, a JC value of 01 means that four data bytes were inserted, and a JC value of 11 means that four dummy bytes were stuffed.

The 15232 columns of payload data can exactly contain an OC-3 signal as long as the OPVC1 and OC-3 clock are running at their nominal rates.

As the above-described structure suggests, one of the similarities between the Digital Wrapper standard, as extended, and SONET is that both employ the layered structure, where one layer concerns itself with framing (placing the client's data into frames) and another layer concerns itself with the payload being carried. One significant difference between SONET and the Digital Wrapper standard is that the former is synchronous, whereas the latter is asynchronous. That is, although all of the nodes' clocks of a network employing the Digital Wrapper standard are close to each other (within +/−40 ppm of each other), there is no requirement that they must be the same.

Thus, in accord with the principles disclosed herein, a client's signal at an ingress node (node A) has to be mapped into the payload area of an OPVC1 frame, with dummy bytes (positive justification), or extra data bytes stuffed (negative justification), as appropriate (as described above), as well as any residual phase-offset information that exists between the client signal clock and the node A clock, and the OPVC1 frame has to be placed into an OPTU1 time slot segment, with an appropriate pointer included in a header portion that points to the beginning of the OPVC1 frame.

FIG. 2 shows is a block diagram showing selected aspects of an ingress node in accordance with the principles disclosed above. Client data is applied to buffer 10, and the client clock is applied to write address counter 11. Under control of the client clock and address counter 11 client data is stored in buffer 10 (which is sometimes referred to as an elastic store). The line from counter 11 to buffer 10 includes both the address bits and the write command. The node's clock $\bar{y}_A$ is applied to processor 14, which gates the clock as necessary and applies the gated clock to read counter 12. The output of counter 12, which includes both the address bits and a read command, is applied to buffer 10 and, under influence of counter 12, data is read out from buffer 10 and applied to processor 14.

The clock gating performed by processor 14 accounts for the header bytes that need to be included in order to create OPVC1 frames, and the justification that needs to be undertaken because of the difference in clock rates between the client's clock and the node's clock. Negative justification is required when the client's clock is higher than nominal and, therefore, bytes need to be stuffed; positive justification is required when the client's clock is lower than nominal and, therefore, dummy bytes need to be inserted; or no justification is undertaken when neither stuffed bytes nor dummy bytes are called for.

Information about the need to justify comes from the read and write counters. Specifically, it is recognized that the difference between the read and write addresses should be bounded if no underflow or overflow should occur in buffer 10, and it is beneficial to have that difference remain as constant as possible. Therefore, the addresses of write counter 11 and read counter 12 are applied to subtractor 13, and the difference is applied to processor 14. Based on that difference, processor 14 determines whether bytes need to be stuffed, dummy bytes need to be inserted, or neither task needs to be undertaken, and behaves appropriately, including creating the appropriate justification control (JC) bits.

The difference produced by subtractor 13 is also applied to sampler 16. Illustratively, once per frame, just after a justification opportunity, the sampler samples the value of the difference that exists between the write counter 11 and the read counter 12. This represents the residual phase-offset between the client clock and the gated system clock, and this difference is applied to processor 14. The phase-offset information is written in to the frame overhead area and transported to the client egress de-mapper at the other end of the network, to be used to regenerate an accurate representation of a clock for the client's signal at the egress node.

The bytes received by processor 14 from buffer 10 based on the gated clock are then augmented with the appropriate JC bits, phase-offset information, and other overhead information, and formatted to create OPVC1 frames at the output of element 20. These frames are applied to processor 15, which creates OPTU1 frames.

Processor 15 injects OPTU1 overhead bytes into the created OPTU1 frames, determines where within the OPTU1 frame the created OPVC1 frames are to be inserted, generates and inserts an appropriate pointer that points to the beginning of the OPVC1 frame in the OPTU1 payload envelope, inserts the OPVC1 frame, and thus creates the OPTU1 frames at the output of processor 15.

Figure 3:
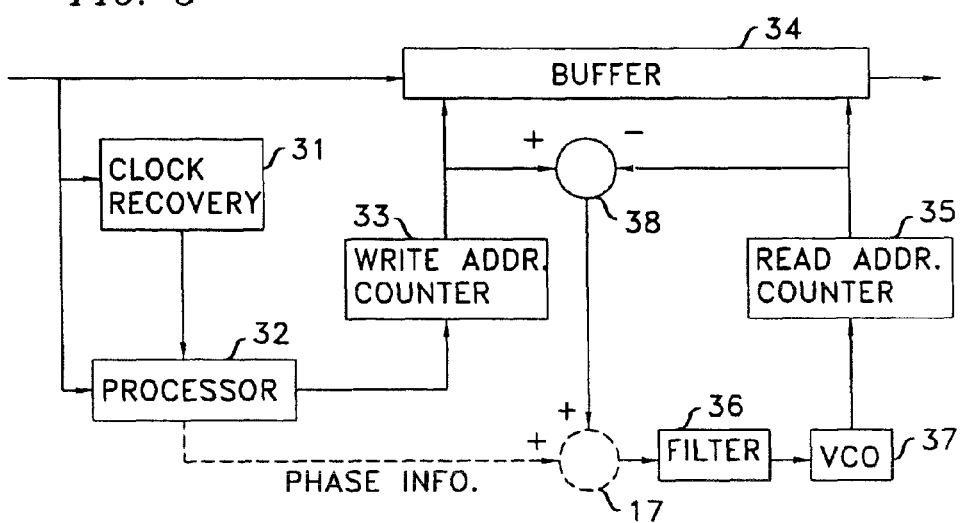
FIG. 3 is a block diagram showing selected aspects of an egress node that complements the ingress node of FIG. 2.

At the egress node, for example, node Z, the reverse of this process must be performed, that is, de-mapping of the client signal from the OPVC1 frame. An embodiment of this process is illustrated in FIG. 3. In FIG. 3, data originating from an upstream node is applied to clock recovery circuit 31 and to processor 32. Circuit 31 recovers the clock of the previous node, and applies it to processor 32. Processor 32 identifies the beginning of the OPTU1 frame, handles the OPTU1 overhead bytes, identifies the pointer, identifies the beginning of the OPVC1 frame, identifies and processes the justification control bits and the phase-offset information and creates a gapped clock that is applied to write counter 33. This gapped clock is an approximation of the gapped clock generated by node A, the gated $\bar{y}_A$ clock, during the mapping process. Under control of address and write commands that are applied by counter 33 to buffer 34, the incoming client data is stored in buffer 34.

Separately, address counter 35 that is advanced by variable control oscillator (VCO) 37 reads data out of buffer 34. The address of counter 35 is subtracted from the address of counter 33 in element 38, and the resulting difference is applied to low pass filter 36. The output of low pass filter 36 controls VCO 37.

The arrangement comprising elements 35, 38, 36 and 37 is a phase lock loop (PLL) arrangement that keeps the difference between counter 33 (which is advanced by the estimate of the gated $\bar{y}_A$ clock) and counter 35 fairly stable. This is a mirror image of the feedback arrangement found in FIG. 2, which keeps the difference between counters 11 and 12 fairly stable, where counter 12 is advanced by clock $\bar{y}_A$. Consequently, the data read out of buffer 34 is fairly close in frequency to the clients data arriving at node A.

If not dealt with, the two impairments discussed earlier, end-to-end mapping impairments and node-to-node pointer processing impairments, will corrupt the quality of the client timing information so as to make it unusable as a timing reference. The amelioration of the node-to-node pointer processing impairments will be discussed below, however the end-to-end mapping will be discussed here. The justification operations performed by the mapping function in node A are essentially controlled by the difference in frequency between the incoming client clock and the OPVC1 clock derived from the node A system clock. If the derived OPVC1 clock is running at a rate that allows the client signal to be almost exactly matched to the OPVC1 payload rate then justification operations will be very infrequent. This creates phase jumps in the client signal data that occur at a very slow rate producing significant low frequency components. The de-mapper at node Z contains the low pass filter 36 that can filter some of this noise, however the cutoff frequency cannot be made arbitrarily low. Therefore, whatever cutoff frequency is specified, a difference between OPVC1 clock and client clock can be determined that will produce low frequency components below the cutoff frequency of the de-mapper filter thus corrupting the client timing. The phase-offset information is added to address this issue.

The phase-offset information extracted by processor 32 is applied to filter 36 via summer 17. The phase-offset information, being updated once per frame, provides a sampled data representation of the frequency components of the client and OPVC1 clock differences, which when summed with the recovered phase difference produced by subtractor 38, nulls out the low frequency error, essentially eliminating the impairment.

Node-to-node pointer processing impairments are introduced by intermediate nodes; i.e., nodes between the ingress node of a signal, and the egress node of a signal. More particularly, the ingress node participates in pointer generation, the egress node participates in pointer interpretation, and the intermediate node participate in pointer interpretation and generation—which we call pointer processing. As a signal arrives at an intermediate node (with respect to the client ingress node, node A), for example, node B, the clock of the arriving signal is extracted, and the OPVC1 frame is extracted from the payload of the OPTU1 frame in a manner similar to that described above in connection with SONET frames (i.e., with the aid of the pointer within the OPTU1 frame's header). At this point the extracted OPVC1 frame is operating on timing that was derived from node A, however, to transmit the OPVC1 frame to the next downstream node it must be operating on local, node B, timing. This is accomplished by adjusting the pointer value (pointer processing) inserted into the outgoing OPTU1 frame in a manner that is also similar to that described in connection with SONET frames. The pointer processing shifts the entire OPVC1 frame within the associated OPTU1 frame, and when the clocks of nodes A and B are relatively close to each other, the negative and positive justifications create low frequency timing components associated with the OPVC1 frame that are embedded in the OPTU1 frame. These low frequency components propagate through the network and ultimately appear at the egress client de-mapper (the operation of this is described above). As was discussed, arbitrary low frequency components cannot be eliminated by the de-mapper low pass filter, and the resulting wander, which can accumulate as the signal passes through network nodes constitutes a problem for communicating client signals that are SONET signals.

Borrowing from a proposal by Michael Klein et al for advanced pointer processing in SDH/SONET networks, in an article entitled "Network Synchronization—A Challenge for SDH/SONET?", IEEE Communication Magazine, September 1993, pp 42-50, al advanced pointer processor would operate as described below.

The general concept behind the advanced pointer processor is to generate pointers such that they contain predominantly high frequency energy which is filtered out at succeeding nodes before generating new pointer values. Specifically, an OPTU1 frame and its timing are recovered from the incoming data stream. Through interpretation of incoming pointer information, an OPVC1 clock is generated from the incoming OPVC1 data stream contained within the OPTU1 frame and any incoming pointers generated by upstream nodes are filtered out (the pointers are responsible for node-to-node timing impairments). The extracted data can then be injected into an OPTU1 frame outgoing from the node under control of an adaptive pointer generator and then be transmitted out of the node. The adaptive nature of the pointer generator provides spectral shaping of the impairments caused by pointer generation, that is, the frequency content of the noise created by the generated pointers is shifted to higher frequencies. This spectral shaping, which is derived from concepts based on sigma-delta modulation, creates a noise spectrum that allows downstream pointer filters (discussed above) to easily remove the pointer generated timing impairments. The combination of incoming pointer filtering and adaptive outgoing pointer generation makes up an advanced pointer processor.

Figure 4:
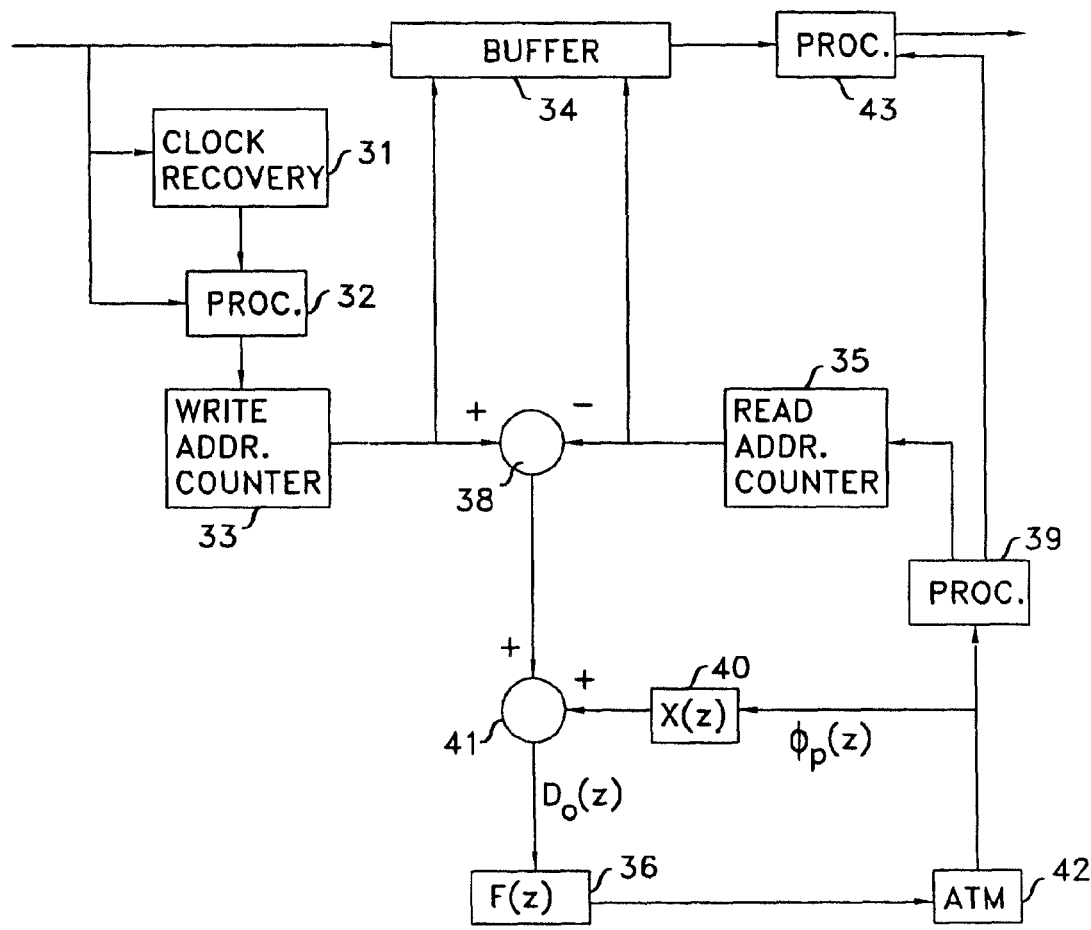
FIG. 4 is a block diagram of a node through which a signal traverses between the ingress node and the egress node.

In accord with the principles disclosed herein, each node undertakes pointer processing that aims to minimize the low frequency components by performing spectral shaping of pointer impairments. It does so by adaptively undertaking negative justifications and compensating positive justifications (or vice versa) where, otherwise, no justification is necessary. In other words, each node injects voluntary positive and compensating negative justifications. This is effected with a circuit like the one shown in FIG. 4. It is similar to the FIG. 3 circuit, except that VCO 37 is replaced by ATM circuit 42, and includes an additional feedback loop, through compensation filter 40 having a transfer function X(z) and summing node 41. The output of buffer 34 in FIG. 4 delivers OPVC1 frames that are processed via processor 43, which adds outgoing pointer information and generates outgoing OPTU1 frames.

In this implementation the compensation filter 40 is required because the incoming pointer filter 36 is located such that it not only filters the incoming write clock (processor 32 produces the write clock which drives write counter 33 which in turn is processed by subtractor 38, thereby producing a write clock component which would then be filtered by filter 36), but also filters the outgoing pointers (processor 39 produces the pointer adjustment signal that controls the read counter 35 which in turn drives the subtractor 38, thereby producing a read clock component that contains pointer adjustment phase information which would then be filtered by filter 36). Since the outgoing pointers must not be filtered (that would essentially nullify the pointer operation which is required in order to compensate for the input and output clock differences), a compensation circuit, compensation filter 40, must be provided to nullify the effects of incoming pointer filter 36 on any adaptive outgoing pointer generation functions performed by adaptive threshold modulator 42.

To determine the transfer function of filter 36, it is noted that the address of read counter 35, which can be represented by a cumulative phase signal, $\phi_r(z)$, is effectively equal to the sum of the phase of the node's clock (gated to account for the overhead bytes), $\phi_n(z)$, and any phase shift due to pointer adjustments, $\phi_p(z)$; i.e., $\phi_r(z)=\phi_n(z)+\phi_p(z)$. The pointer adjustment signal is the cumulative phase shift resulting from pointer justification operations, either no pointer justification, positive justification of four bytes, or negative justification of four bytes. It is also noted that the address of write counter 33 can be represented by a cumulative phase signal, $\phi_w(z)$.

The output signal produced by the phase detector 38 that is applied to summing node 41, which is a number that changes each time the read or the write counters (35 and 33, respectively) are incremented, and also represents a phase signal, is the difference between the read and write addresses $D_o(z)=\phi_n(z)+\phi_p(z)-\phi_w(z)$. The output of filter 40 is $X(z)\phi_p(z)$, and therefore the input to filter 36 is $D_o(z)+X(z)\phi_p(z)$, or $\phi_n(z)-\phi_w(z)+\phi_p(z)(1+X(z))$. The output of filter 36, therefore, is $$[\phi_n(z)-\phi_w(z)+\phi_w(z)(1+X(z))]F(z). \quad (1)$$

We observe that for proper operation, the input to adaptive threshold modulator 42 must equal the phase difference between the read clock (which includes pointer adjustments) and the filtered write clock, that is, the outgoing pointer adjustments that appear as part of the read clock must not be filtered. Therefore, for proper operation the input to adaptive threshold modulator 42 must correspond to $$(\phi_n(z)-\phi_w(z))F(z)+\phi_p(z). \quad (2)$$

Setting equation (1) equal to equation (2) yields $$X(z)=(1-F(z))/F(z). \quad (3)$$

We found that the transfer functions pair $$X(z) = \frac{(1-z^{-1})(1-az^{-1})}{K(1-bz^{-1})} \quad (4)$$

and $$F(z) = \left(\frac{K}{K+1}\right)\frac{(1-bz^{-1})}{1-\left(\frac{1+a+Kb}{K+1}\right)z^{-1}+\left(\frac{a}{K+1}\right)z^{-2}} \quad (5)$$

with X(z) representing a differentiated first order high pass function and F(z) representing a second order low pass filter function, work well.

The implementation suggested by equation (4) for X(z) includes a $(1-z^{-1})$ term, which represents a differentiator function, followed by a high pass filter. The input to the X(z) function is the cumulative phase output of the adaptive threshold modulator 42, which is represented by a stairstep function that jumps up or down by four bytes of phase magnitude whenever a positive or negative pointer justification occurs. Differentiation of this type of signal produces a series of unit impulses at each positive or negative pointer justification. By including this differentiation function as part of the ATM functionality and having processor 39 operate on simple positive or negative justification indications instead of cumulative phase, the differentiation term in X(z) can be eliminated.

Figure 5:
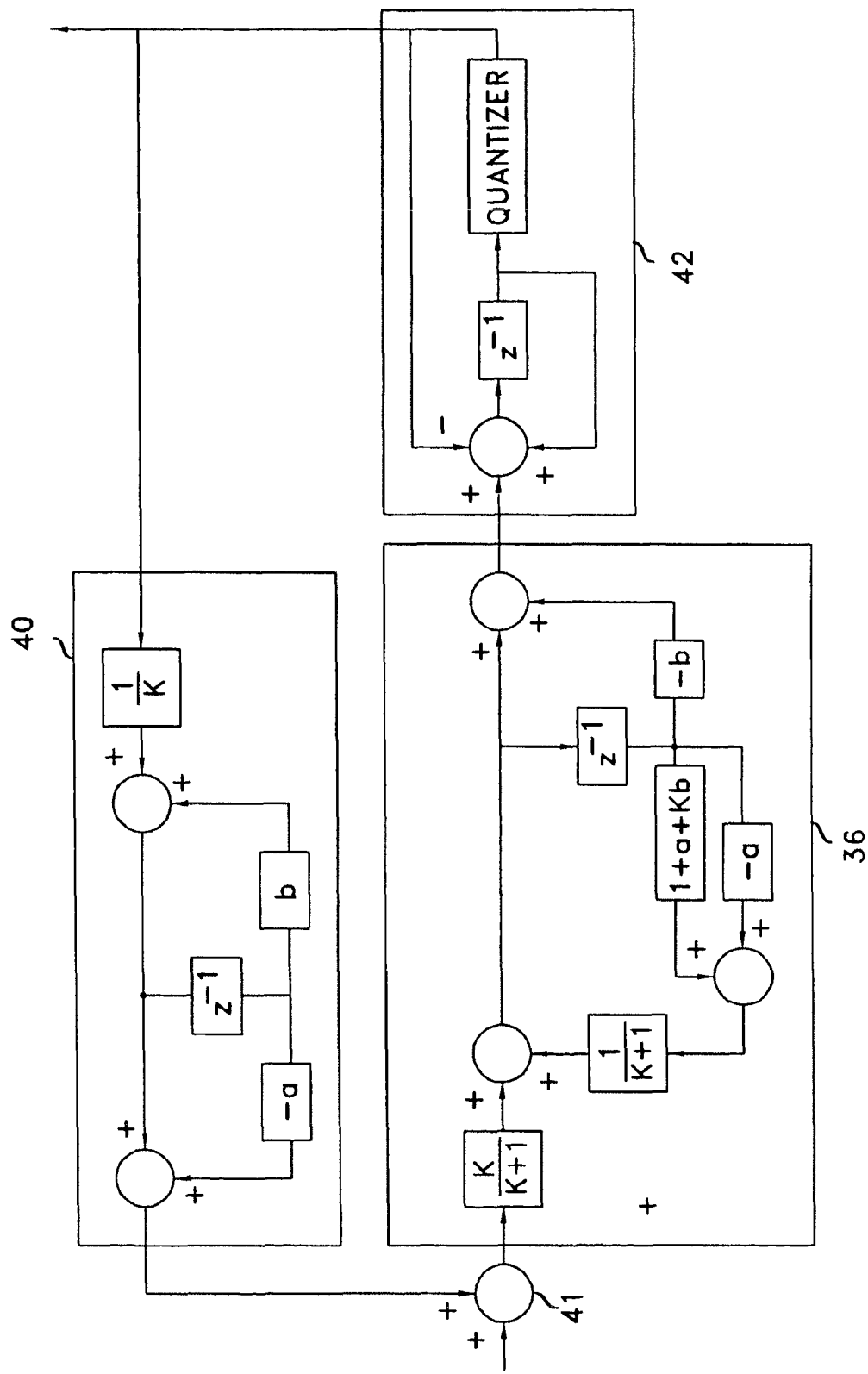
FIG. 5 shows the circuit arrangement that performs modified pointer processing.

The resulting implementation of FIG. 5 shows the physical implementation of these filters, including the implementation of the ATM circuit 42. It should be noted that the quantizer block simply makes the pointer adjustment decisions instead of outputting cumulative phase information.

This processing performed at node B is performed at each succeeding downstream node until the client signal egress node is reached. As a signal arrives at the egress node, for example, node Z, the clock of the arriving signal is extracted, and the OPVC1 frame is extracted from the payload portion of the OPTU1 frame in the same manner as described for node B. Also, as for node B, an OPVC1 clock is generated from the incoming OPVC1 data stream and any incoming pointers generated by upstream nodes are filtered. The signal is then processed as described above for the egress node de-mapping function.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method of extending a digital wrapper protocol defined by ITU Recommendation G.709 to support sub-wavelength channels, the method comprising:
  receiving a data signal comprising one or more tributary groups within an OTU1 frame;
  compensating for end-to-end timing impairments introduced due to client signal mapping and unmapping functions using phase-offset information; and
  compensating for node-to-node timing impairments introduced due to pointer processing using a pointer filter in conjunction with an adaptive pointer generator, wherein the adaptive pointer generator is configured to filter upstream pointers generated by previous nodes to adaptively generate pointers to allow downstream filters to remove their effects in succeeding nodes.

2. The method of claim 1, wherein the phase-offset information is transported with the data signal.

3. The method of claim 1, wherein the data signal comprises a full transparent client signal.

4. The method of claim 1, further comprising:
  providing frames in a digital wrapper protocol defined by ITU Recommendation G.709, wherein the frames are defined as a block of 4080 columns and four rows, comprising 14 columns that are assigned to overhead bytes, followed by two columns that are assigned to mapping and concatenation specific bytes, followed by 3808 columns that are assigned to payload, and followed by 256 columns that are assigned to forward error correction; and
  forming a group of 16 communication frames by employing the 3808 columns of the payload and the two columns of the mapping and concatenation specification bytes of 64 of blocks, to form said group of 16 communication frames, each of which contains 15240 columns.

5. The method of claim 4, wherein the 16 communication frames are di-byte interleaved, wherein di-byte interleaving comprises assigning a first two columns of a large frame to a first timeslot, a second two columns of the large frame to a second timeslot, etc.; and wherein each of the communication frames comprises an overhead field and a payload field.

6. The method of claim 5, wherein the payload field is adapted to receive framing layer frames of 15236 columns, and the overhead field provides four columns of overhead information of the communication layer frames.

7. The method of claim 6, wherein the overhead information of the communication layer frames comprises bytes devoted to carrying pointer information.

8. The method of claim 6, wherein each of the framing layer frames comprises an overhead field and a payload field; and wherein the payload field is adapted to receive client signal frames of 15236 columns, and the overhead field provides four columns of overhead information of the framing layer frames.

9. A network utilizing an extension to a digital wrapper protocol defined by ITU Recommendation G.709 to support sub-wavelength channels, the network comprising:

an ingress node;

an egress node;

one or more links connecting the ingress node and the egress node;

wherein the ingress node maps an applied client signal to a group of one or more tributary groups within an OTU1;

compensating for end-to-end timing impairments introduced due to client signal mapping and unmapping functions using phase-offset information; and compensating for node-to-node timing impairments introduced due to pointer processing using a pointer filter in conjunction with an adaptive pointer generator wherein the adaptive pointer generator is configured to filter upstream pointers generated by previous nodes to adaptively generate pointers to allow downstream filters to remove their effects in succeeding nodes.

10. The network of claim 9, wherein the ingress node develops a measure of phase difference between the applied client signal and a native clock of the ingress node, and includes this measure in a signal transmitted to the egress node; and wherein the egress node employs the phase difference measure that accompanies a received client signal to develop a clock for outputting a received client signal from the one or more tributary groups.

11. The network of claim 9, wherein the ingress node comprises circuitry configured to form the one or more tributary groups by:

providing frames in a digital wrapper protocol defined by ITU Recommendation G.709, wherein the frames are defined as a block of 4080 columns and four rows, comprising 14 columns that are assigned to overhead bytes, followed by two columns that are assigned to mapping and concatenation specific bytes, followed by 3808 columns that are assigned to payload, and followed by 256 columns that are assigned to forward error correction; and forming a group of 16 communication frames by employing the 3808 columns of the payload and the two columns of the mapping and concatenation specification bytes of 64 of said blocks, to form said group of 16 communication frames, each of which contains 15240 columns.

* * * * *